US012759880B2

(12) United States Patent
Abolhasani et al.

(10) Patent No.: US 12,759,880 B2
(45) Date of Patent: Oct. 13, 2026

(54) MODULAR FLOW REACTORS FOR ACCELERATED SYNTHESIS OF INDIUM PHOSPHIDE QUANTUM DOTS

(71) Applicant: North Carolina State University, Raleigh, NC (US)

(72) Inventors: Milad Abolhasani, Raleigh, NC (US); Mahdi Ramezani, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 1064 days.

(21) Appl. No.: 17/932,447

(22) Filed: Sep. 15, 2022

(65) Prior Publication Data

US 2023/0021452 A1 Jan. 26, 2023

Related U.S. Application Data

(63) Continuation of application No. PCT/US2021/021621, filed on Mar. 10, 2021.

(60) Provisional application No. 62/991,099, filed on Mar. 18, 2020.

(51) Int. Cl.

| | |
|---|---|
| ***C01B 25/08*** | (2006.01) |
| ***B01J 19/18*** | (2006.01) |
| ***B82Y 40/00*** | (2011.01) |
| ***C09K 11/70*** | (2006.01) |

(52) U.S. Cl.

CPC ............ *C01B 25/087* (2013.01); *B82Y 40/00* (2013.01); *C09K 11/70* (2013.01); *C01P 2004/84* (2013.01)

(58) Field of Classification Search

CPC ....... C01B 25/087; B82Y 40/00; B82Y 20/00; C09K 11/70; C09K 11/883; C01P 2004/84; B01J 19/1831; B01J 19/0013; B01J 19/0053; B01J 19/1856; B01J 2219/00051

USPC .......................................................... 422/600

See application file for complete search history.

(56) References Cited

U.S. PATENT DOCUMENTS

| | | | | |
|---|---|---|---|---|
| 2017/0189879 | A1* | 7/2017 | Simsek | B01J 19/004 |
| 2018/0221961 | A1* | 8/2018 | Bakr | B22F 9/26 |
| 2018/0312753 | A1 | 11/2018 | Bakr et al. | |

FOREIGN PATENT DOCUMENTS

| | | | |
|---|---|---|---|
| KR | 20180108134 | A | 10/2018 |
| WO | 2019055360 | A1 | 3/2019 |

OTHER PUBLICATIONS

WIPO; International Search Report and Written Opinion for International Patent Application No. PCT/US21/21621 dated Sep. 29, 2022, 7 pages.

ISA/KR; International Search Report and Written Opinion for International Patent Application No. PCT/US2021/021621 dated Jun. 25, 2021, 11 pages.

Baek, J., et al., "Multistage Microfluidic Platform for the Continuous Synthesis of III-V Core/Shell Quantum Dots", Angewandte Chemie International Edition, 2018, vol. 57, 4 pages.

(Continued)

*Primary Examiner* — Huy Tram Nguyen

(74) *Attorney, Agent, or Firm* — NK Patent Law

(57) ABSTRACT

System for synthesis of colloidal nanomaterial includes a multi-stage modular flow reactor that includes four distinct reactor modules for in-flow synthesis of colloidal nanomaterial. The system further includes a computer module for monitor and control of operations of the four reactor modules.

20 Claims, 12 Drawing Sheets

(56) References Cited

OTHER PUBLICATIONS

Ippen, C., et al., "InP/ZnSe/ZnS: A Novel Multishell System for InP Quantum Dots for Improved Luminescence Efficiency and Its application in a Light-Emitting Device", Journal of Information Display, 2012, vol. 13, No. 2, 6 pages.

KIPO, Non-Final Office Action for corresponding South Korean Patent Application No. 10-2022-7036085, mailed Jul. 24, 2025, 17 pages including translation.

* cited by examiner

MODULAR FLOW REACTORS FOR ACCELERATED SYNTHESIS OF INDIUM PHOSPHIDE QUANTUM DOTS

CROSS-REFERENCE TO RELATED APPLICATIONS

The This application claims the benefit of International Patent Application No. PCT/US21/21621, filed on Mar. 10, 2021, which claims priority to U.S. Provisional Patent Application 62/991,099 filed on Mar. 18, 2020, the contents of which are all hereby incorporated by reference in their entirety.

TECHNICAL FIELD

The present invention relates generally to the field of semiconductor nanocrystals, and particularly, to a system and method for fabricating semiconductor nanocrystals such as quantum dots (QDs).

BACKGROUND

Interest in nanomaterials and nanocrystals has spiked in recent years. Quantum dots (QDs) are nanocrystals that emit light in the entire visible and near infrared spectral region depending on particle sizes and compositions. QDs possess chemical robustness, excellent optical and photovoltaic properties as well as composition tunability. This provides unique opportunities for optoelectronic applications and devices such as bioimaging, light emitting diodes (LEDs), visual displays, sensors, photovoltaic devices, lasers, solid-state lighting etc. QDs are very difficult to manufacture in a repeatable manner, since any change in their size will affect the color they emit. Current means of producing QDs through flask chemistry are poorly amenable to large-scale synthesis and require a highly specialized operator to maintain quality in a repeatable manner.

As the global demand for nanomaterials quickly increases, alternative means of production that are scalable and less specialized and that provide for improved consistency of quality would be valuable. Accordingly, opportunities exist for improving the production methods used in manufacturing quantum dots (QDs).

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In accordance with the purposes of the disclosed devices and methods, as embodied and broadly described herein, the disclosed subject matter relates to devices and methods of use thereof. Additional advantages of the disclosed devices and methods will be set forth in part in the description, which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

Disclosed herein is a system for synthesis of colloidal nanomaterials. In various embodiments, the system includes a multi-stage modular flow reactor comprising at least four distinct reactor modules for in-flow synthesis of a colloidal nanomaterial, and a computer module for monitor and control of the at least four reactor modules.

According to one or more embodiments, the colloidal nanomaterial comprises quantum dots.

According to one or more embodiments, at least one module comprises a variable volume module, wherein the volume is adjusted by opening or closing of one or more serpentine channels of the module.

According to one or more embodiments, the volume is adjusted based on a target colloidal nanomaterial to be synthesized.

According to one or more embodiments, each module is one of machined heating module tor a reusable heating module.

According to one or more embodiments, each module comprises a Teflon material placed within a machined module, a Teflon material placed within a machined module, or a stainless-steel tubing placed within a machined module.

According to one or more embodiments, a first module of the at least four reactor modules performs one or more of: preheating a first precursor comprising indium zinc (In—Zn); providing a hot injection port for a second precursor comprising phosphorus; and, mixing the first and second precursors in a micromixer at a predetermined temperature.

According to one or more embodiments, a second module of the at least four reactor modules is a rapid heating reactor capable of heating an output of the first module to a temperature of up to 240° C. in about 3 seconds, wherein the second module comprises a Teflon material.

According to one or more embodiments, a second module of the at least four reactor modules is a rapid heating reactor capable of heating an output of the first module to a temperature of up to 500° C. in about 3 seconds, wherein the second module comprises a stainless-steel tubing.

According to one or more embodiments, a third module of the at least four reactor modules is a ramp heating reactor capable of heating an output of the second module at a temperature ramp rate of between 2° C./minute and 50° C./minute.

According to one or more embodiments, a fourth module of the at least four reactor modules is a reactor applying a temperature of up to 500° C. to an output of the third module to initiate growth and size focusing of one or more of an indium phosphide (InP) core and multiple layers of zinc selenide-zinc sulfide (ZnSe/ZnS) shell growth.

According to one or more embodiments, the computer module monitors photophysical properties of the quantum dots being synthesized at one or more of: an outlet of a last module of the at least four reactor modules after cooling down of a reaction mixture; in-situ at a synthesis temperature; and at an outlet of each module According to one or more embodiments, a first half-width-at-half-maximum (HWHM1) of the quantum dots is one or more of: possessing an energy of below 90 meV and having a variation of 1.4% or less.

According to one or more embodiments, a peak/valley ratio of the quantum dots has a variation of 1.4% or less.

According to one or more embodiments, a first excitonic peak wavelength ($\lambda_P$) of the quantum dots is tuned in a range of 425 nm<$\lambda_P$<475 nm for an InP core and 495 nm<$\lambda_P$<550 nm for a InP QD core with multiple layers of zinc selenide-zinc sulfide (ZnSe/ZnS) coating.

According to one or more embodiments, the first excitonic peak wavelength ($\lambda_P$) of the quantum dots has a variation of 0.2% or less over a plurality of quantum dot synthesis sessions.

According to one or more embodiments, the system comprises at least thirty parallel quantum dot synthesizing channels providing a continuous manufacturing throughput of up to 50 kg/day, each channel comprising a single multi-stage modular flow reactor.

Provided herein is a method of synthesizing quantum dots using an in-flow modular flow reactor. In various embodiments, the method includes providing a system comprising a multi-stage modular flow reactor comprising at least four distinct reactor modules for in-flow synthesis of quantum dots; and a computer module for monitor and control of the at least four reactor modules. The method further includes performing in-flow synthesis of quantum dots using the system.

According to one or more embodiments, further comprising: monitoring, by the computer module, of photophysical properties of the quantum dots being synthesized at one or more of: an outlet of a last module of the at least four reactor modules after cooling down of a reaction mixture; in-situ at a synthesis temperature; and at an outlet of each module According to one or more embodiments, further comprising: applying, by the computer module, of machine learning (ML) techniques for in-situ optimization of the synthesis of quantum dots.

BRIEF DESCRIPTION OF THE DRAWINGS

The foregoing, as well as the following Detailed Description of preferred embodiments, is better understood when read in conjunction with the appended drawings. For the purposes of illustration, there are shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 4 presents a set of results of colloidal InP QD production in flow.

DETAILED DESCRIPTION OF THE EMBODIMENTS

Figure 1:
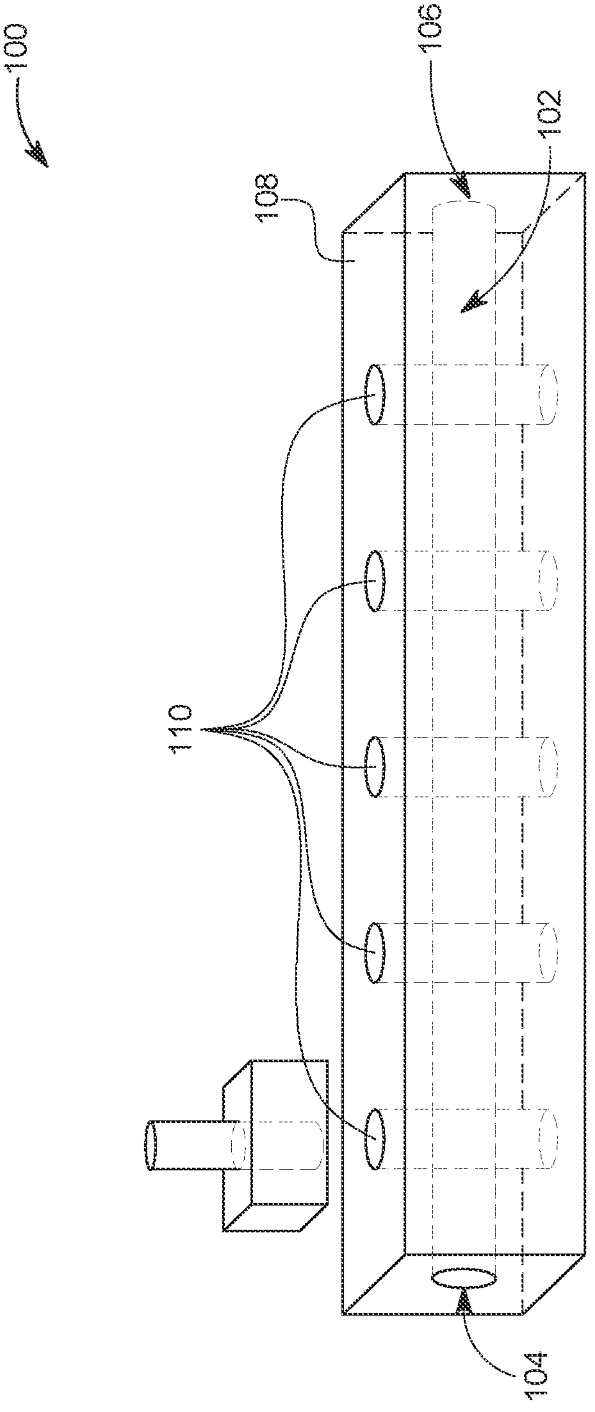
FIG. 1 illustrates a schematic view of a multi-stage modular flow reactor, in accordance with some embodiments of the presently disclosed subject matter.

The following description and drawings are illustrative and are not to be construed as limiting. Numerous specific details are described to provide a thorough understanding of the disclosure. However, in certain instances, well-known or conventional details are not described in order to avoid obscuring the description. References to “one embodiment” or “an embodiment” in the present disclosure can be, but not necessarily are, references to the same embodiment and such references mean at least one of the embodiments.

Reference in this specification to “one embodiment” or “an embodiment” means that a particular feature, structure, or characteristic described in connection with the embodiment is included in at least one embodiment of the disclosure. The appearances of the phrase “in one embodiment” in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 3:
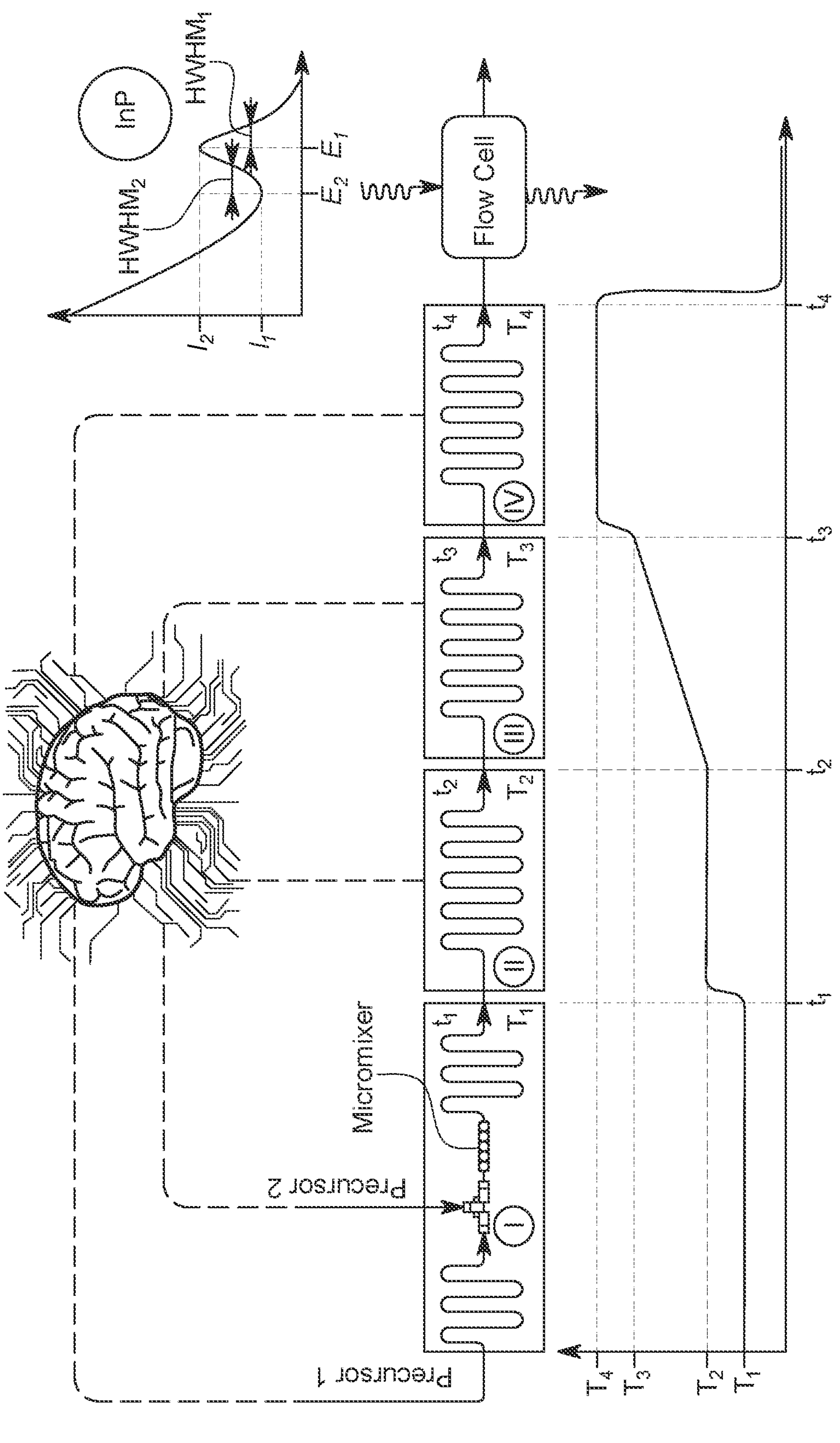
FIG. 3 illustrates a schematic view of a four-stage modular flow reactor platform comprising four separate flow reactor modules, in accordance with some embodiments of the presently disclosed subject matter.

Embodiments of the presently disclosed subject matter advantageously provide for design and integration of an improved modular flow reactor technology for accelerated in-flow synthesis of quantum dots (QDs) such as, for example, indium phosphide (InP) QDs in addition to similar other QDs. According to various embodiments of the presently disclosed subject matter, a system as provided herein utilizes a computer-controlled modular flow synthesis platform that comprises at least four individual (i.e., separate or distinct) reactors; each of the at least four individual reactors may hereinafter be alternately referred to as a "reactor module" for ease of reference. Each reactor module represents a distinct stage of the multi-stage modular flow reactor. Each reactor module—in and of itself—represents a distinct/separate self-contained reactor. The length and volume of each flow reactor stage as well as the number of each flow reactor stage can be tuned based on the target QD material. FIG. 3, for example, illustrates an exemplary system comprising four distinct reactor modules. It is to be noted that different temperature profiles that could be obtained by this system, with on exemplary temperature profile being illustrated in FIG. 3. Both rapid and slow heating/cooling in addition to tunable temperature gradient profiles can be accomplished by the multi-stage flow reactor as disclosed herein. The multi-stage flow reactor can provide for in-situ obtained UV-Vis (Ultraviolet-visible spectroscopy) absorption spectra of InP QDs to be obtained at room temperature at the outlet of flow reactor (IV), with real-time measurement of first excitonic peak wavelength, peak to valley ratio intensity of the first excitonic peak wavelength, and half-width-at-half-maximum of the first excitonic peak wavelength. In various embodiments, the computer module as mentioned herein may be configured for in-situ monitoring either at the outlet after cooling down the reaction mixture or in-situ at the synthesis temperature, or after each heating module. The room temperature in-situ spectroscopy may include both UV-Vis absorption and photoluminescence spectroscopy. The in-situ spectroscopy at high temperatures (higher than 150 C) may only include UV-Vis absorption spectroscopy.

Embodiments of the presently disclosed subject matter accordingly provide for a system for in-flow synthesis of quantum dots. In various embodiments, the system comprises a multi-stage modular flow reactor comprising at least four reactor modules for in-flow synthesis of quantum dots (QDs). The system further comprises a computer module or controller (hereinafter referred to as "computer module") for monitor and control of operations of the at least four reactor modules. In one embodiment, the QDs synthesized by the system comprise indium phosphide (InP). In at least one embodiment, the computer module comprises an integrated circuit (IC) controller and the overall process automation algorithms. In various embodiments, the flow reactor material (i.e., tubing) of each module can be either a Teflon material, a Teflon variant, or stainless steel with inner diameter from 50 um up to 5 mm. The heating modules (2D plates or 3D helical heaters) can be made from aluminum, stainless steel, copper and similar other materials and combinations thereof. In various embodiments, each of the flow reactor modules may be made of Teflon or include stainless steel tubing placed inside a machined/reusable heating module (2D plate or 3D helical heating module). As used herein, the term "Teflon" as used herein refers to tough synthetic resin made by polymerizing tetrafluoroethylene. Polytetrafluoroethylene (PTFE) is a synthetic fluoropolymer of tetrafluoroethylene. As used herein, the term "Teflon" can include PTFE (polytetrafluoroethylene) and PFA (perfluoroalkoxy). As used herein, the terms "Teflon variant material" and "Teflon-like material" may include, but are not limited to: FEP (fluorinated ethylene propylene), PVDF (polyvinylidene fluoride), ETFE (ethylene tetrafluoroethylene), ECTFE (ethylene chlorotrifluoroethylene), MFA (tetrafluoroethylene perfluoromethylvinylether), THV (terpolymer of tetrafluoroethylene, hexafluoropropylene and vinylidene fluoride), PCTFE (polychlorotrifluoroethylene), and PEEK (polytetrafluoroethylene), and similar other materials.

The flow reactor material (i.e., tubing) of each module can be either Teflon or stainless steel with inner diameter from 50 um up to 5 mm. The heating modules (2D plates or 3D helical heaters) can be made from aluminum, stainless steel, or copper. Teflon variants can include fluorinated ethylene propylene (FEP) or similar other materials. When polymeric Teflon tubing is used, this maximum temperature will be 260 C, but when stainless steel tubing is used, this maximum temperature will be 500 C. The heating module is designed in a way that different flow reactor length (volume) could be accommodated within the same heating module by using different number of serpentine channels. Every heating module of this multi-stage reactor: accommodation of variable flow reactor length (volume) in the same heating module (both 2D plate and 3D helical heaters) using different number of loops or serpentine channels of the heating modules. The 2D plate and 3D helical heaters used may be any of those commonly known in the relevant art. A helix is the formal scientific term for a spiral configuration. When referring to metal tubing, helical coils are a metal tube that has been bent into a spiral shape. Depending upon the required specifications of the finished product, a helical coil may consist of only one or two spiral turns or may be a series of spirals several feet in length. Copper, steel and aluminum piping can all be formed into helical coils, and each type of metal has its own benefits and drawbacks that make it useful for different applications. The size of piping that can be formed into a helical coil is limited by the available bending dies but is generally less than eight inches in diameter. Helical coils are effective as heat exchangers because the coils increase the amount of surface area in contact with the substance to be heated or cooled. Additional surface area increases the rate of heat transfer. When used to heat a fluid, a coil is immersed in the fluid and then filled with hot water or steam. The heat from the coil raises the temperature of the surrounding liquid or gas.

The modular flow reactor accordingly provides for accelerated flow synthesis of InP QDs with tunable flow reactor length/volumes within the same heating module, in accordance with some embodiments of the presently disclosed subject matter. Accordingly, each module of the modular flow reactor accommodates different length (volume) of flow reactors without the need to redesign and machine a new heating module. The length and volume of each flow reactor stage as well as the number of each flow reactor stage can be tuned based on the target QD material.

Embodiments of the presently disclosed subject matter provide for a modular, reconfigurable reactor system that includes a novel micromixer and a novel temperature gradient capability. Embodiments of the presently disclosed subject matter further provide for an integrated modular flow reactor that is configured for the synthesis of high-quality InP QDs at a rate that is at least twenty times faster than conventional batch synthesis techniques while simultaneously achieving superior properties such as, for example, better size distribution and fewer surface defects. Embodiments of the presently disclosed subject matter further provide for accelerated synthesis, discovery and optimization of QDs such as InP QDs. Embodiments of the presently disclosed subject matter furthermore provide for continuous manufacture of QDs at an industrially relevant scale (for e.g., 50 kg/day or more).

FIG. 3 is a schematic illustration of the four-stage modular flow reactor platform comprising four separate flow reactor modules I through IV. According to at least one embodiment, flow cell and machine learning capabilities are incorporated into the modular flow reactor technology to enable machine learning-accelerated synthesis and optimization of colloidal QDs synthesized in flow (artificial chemist).

Figure 4A:
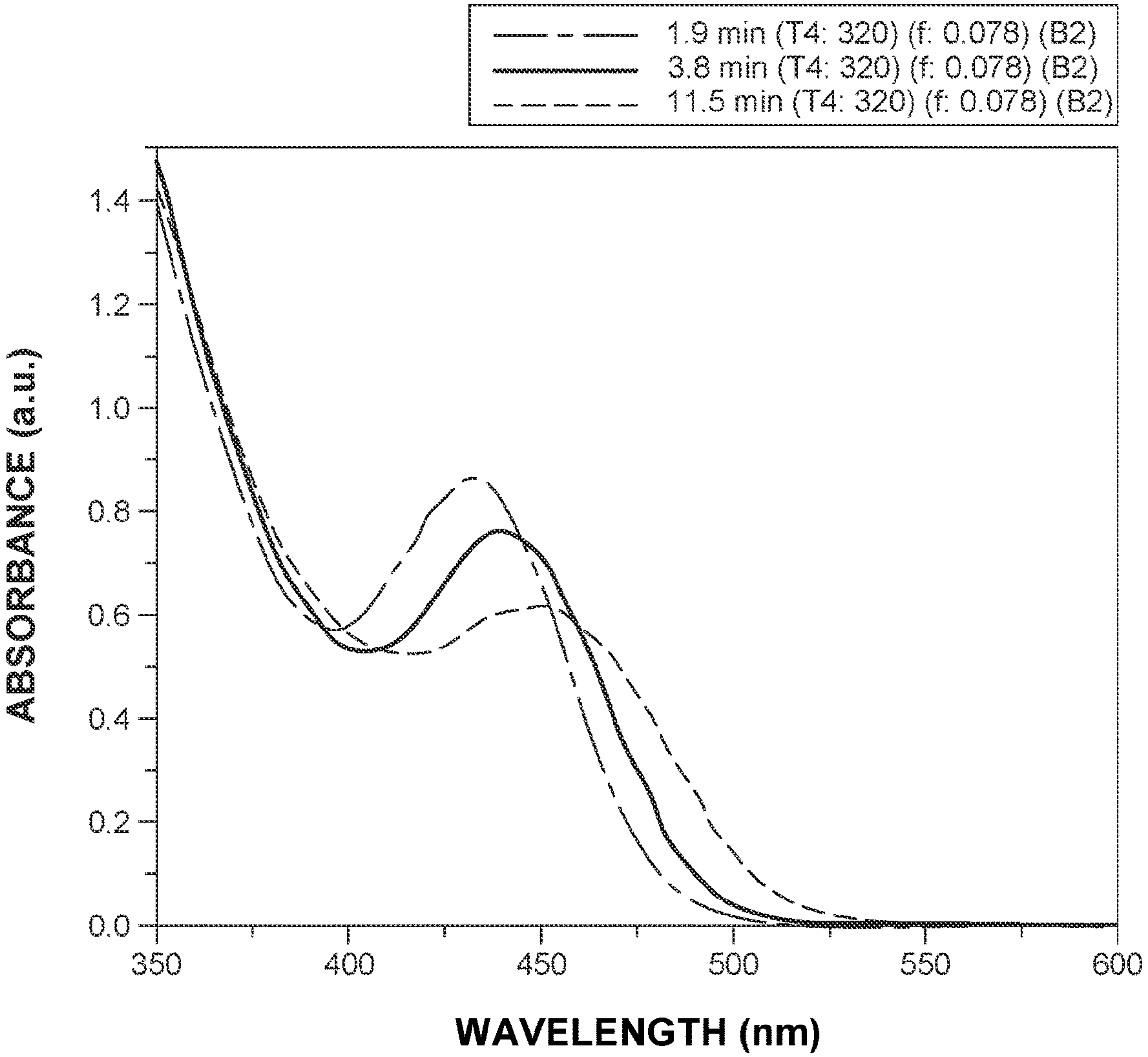
FIG. 4A illustrates the effect of residence time (i.e., total reaction time in the multi-stage flow reactor)
Figure 4B:
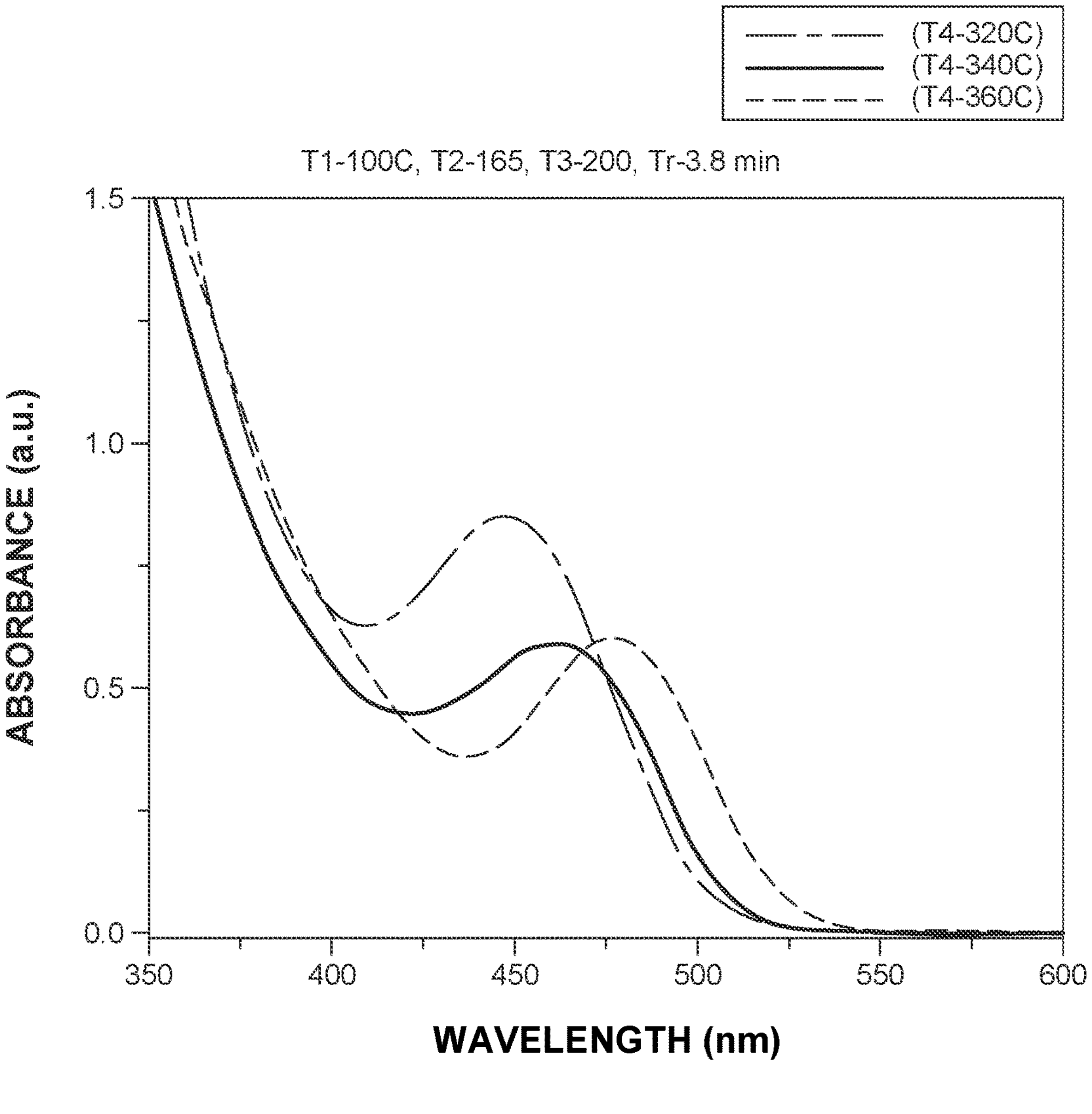
FIG. 4B illustrates the effect of indium and phosphorus precursor ratio.
Figure 4C:
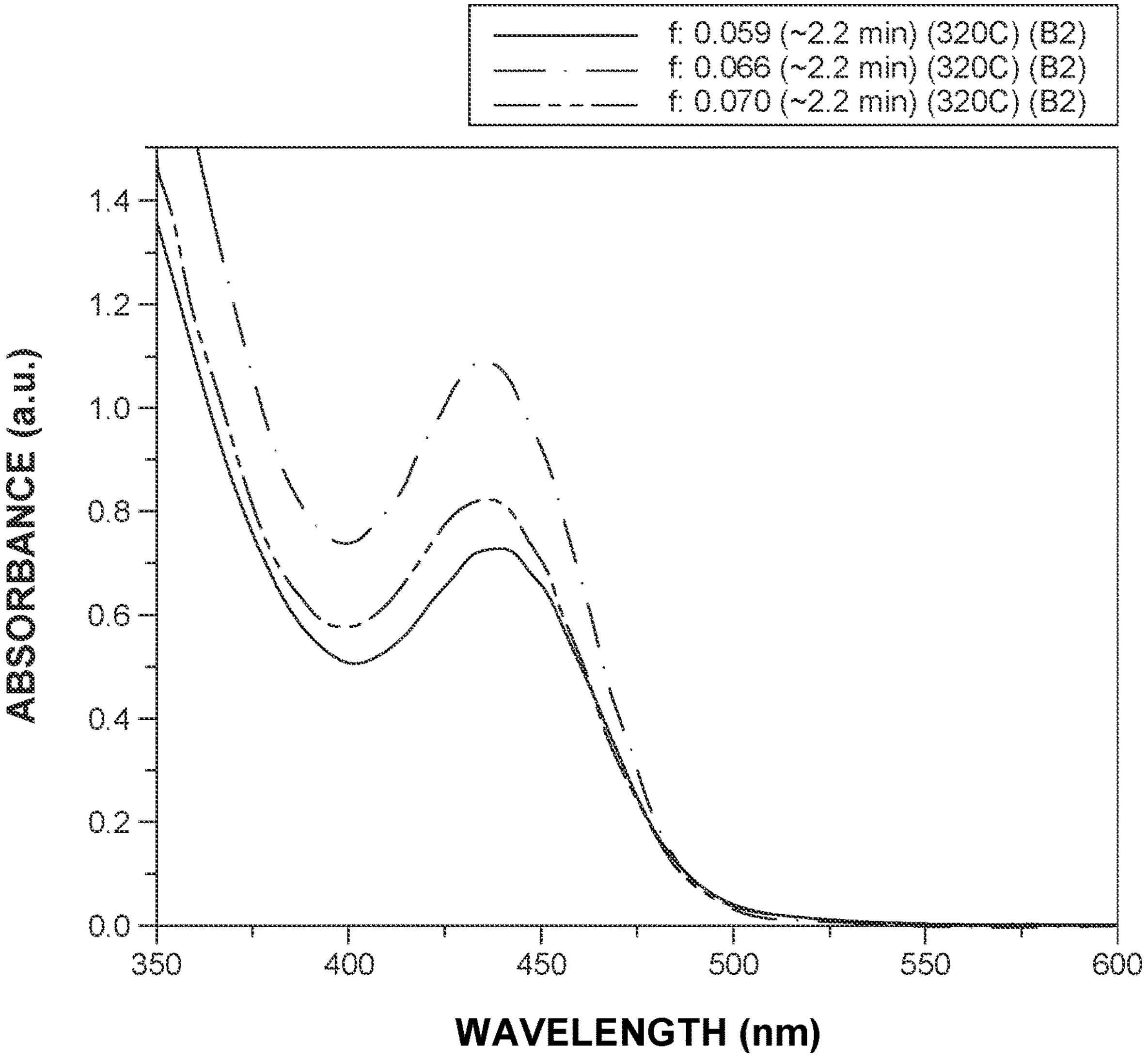
FIG. 4C illustrates the effect of final reaction temperature at the final stage (module IV)
Figure 4D:
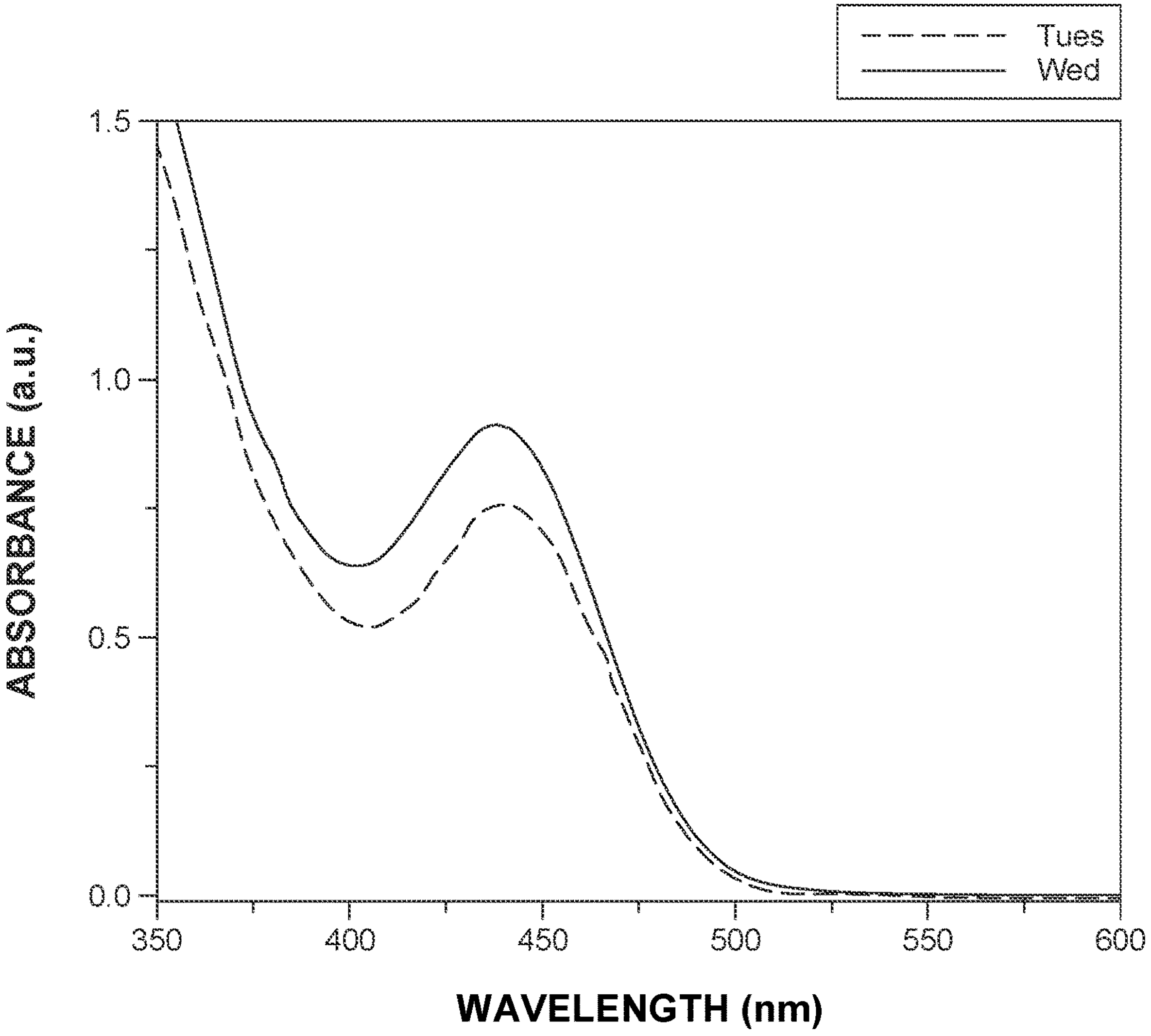
FIG. 4D illustrates reproducibility of the InP QD synthesis results, in accordance with some embodiments of the presently disclosed subject matter.

FIGS. 4A-4D present a set of results of colloidal InP QD production in flow, according to one or more embodiments of the presently disclosed subject matter. FIG. 4A illustrates an effect of residence time (i.e., total reaction time in the multi-stage flow reactor), FIG. 4B illustrates the effect of indium and phosphorus precursor ratio, FIG. 4C illustrates the effect of final reaction temperature at the final stage (module IV), and FIG. 4D illustrates reproducibility of the InP QD synthesis results.

Figure 5:
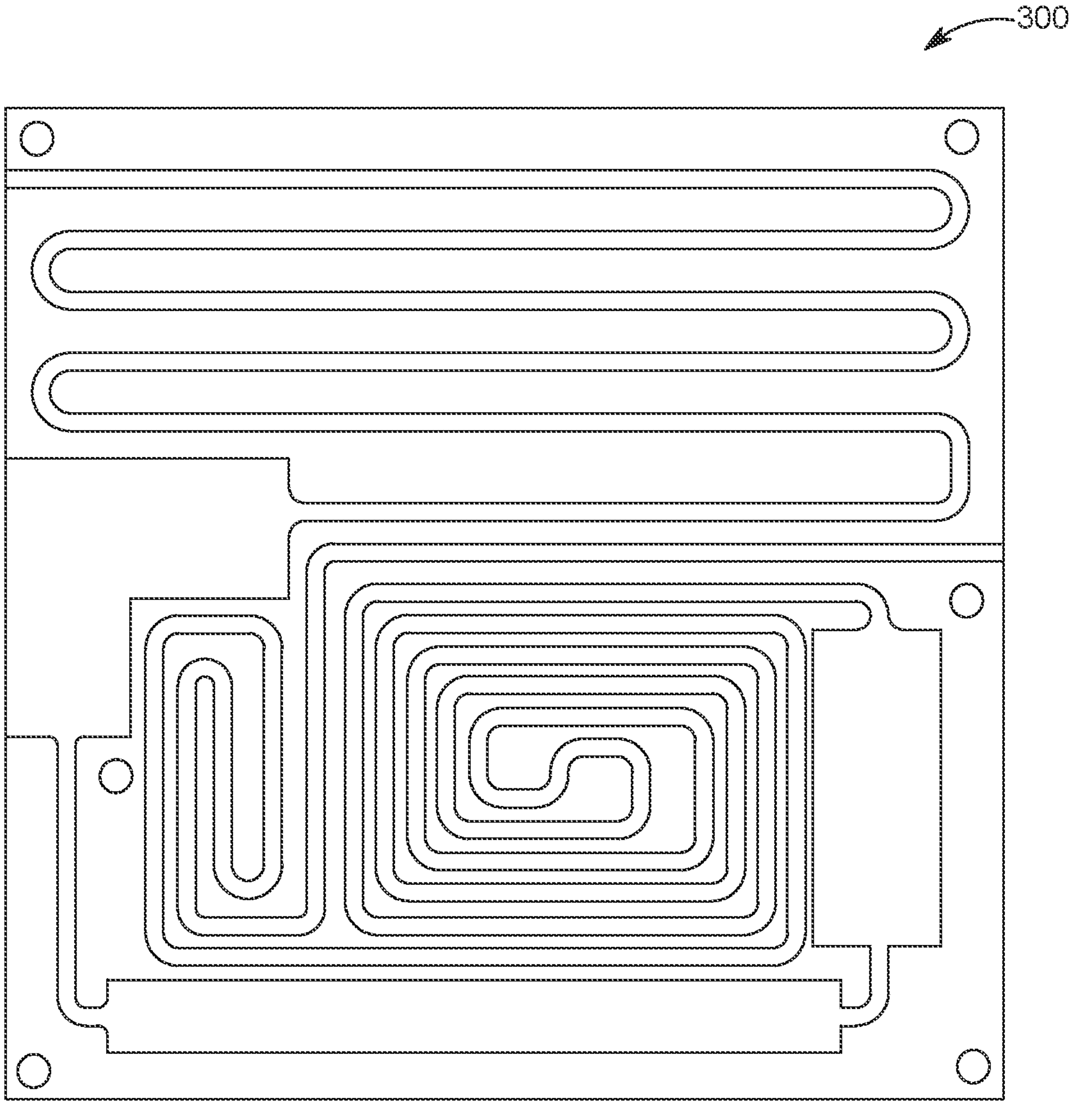
FIG. 5 is an illustration of a first module forming part of a modular flow reactor for use in the accelerated flow synthesis of InP QDs, in accordance with some embodiments of the presently disclosed subject matter.

FIG. 5 is an illustration of module 300, which may represent a first module (or "Module I") of the modular flow reactor for use in the accelerated flow synthesis of quantum dots such as InP QDs, according to at least one embodiment of the presently disclosed subject matter. The first module illustrated in FIG. 5 is configured to perform tasks such as preheating a first precursor; providing a hot injection port for a second precursor; and, mixing the first and second precursors at a predetermined temperature in a micromixer. In one embodiment, the first module operates to preheat an indium zinc (In—Zn) precursor; the first module may further operate to provide a hot injection port for a phosphorus (P) precursor; the first module furthermore may operate and mix the two streams at reactor temperature using a static micromixer embedded within a heating module. In one embodiment, the micromixer may include a braided Teflon tubing with an inner diameter of between 20 μm and 1.6 mm and an outer diameter of between 1/16" and 1/8"; however, other dimensions are also possible. As is well-known in the relevant art, a micromixer is a device based on mechanical microparts used to mix fluids. The micromixer may make use of the miniaturization of the fluids associated in the mixing to reduce quantities involved in the chemical and/or biochemical processes. It may also allow for fast inline mixing of the two streams of In—Zn and P precursors at the specified temperature. However, the first and second precursors may be chosen depending on the ultimate QDs to be manufactured by the system. The first module preforms a first step of a method performed by the system.

Figure 6:
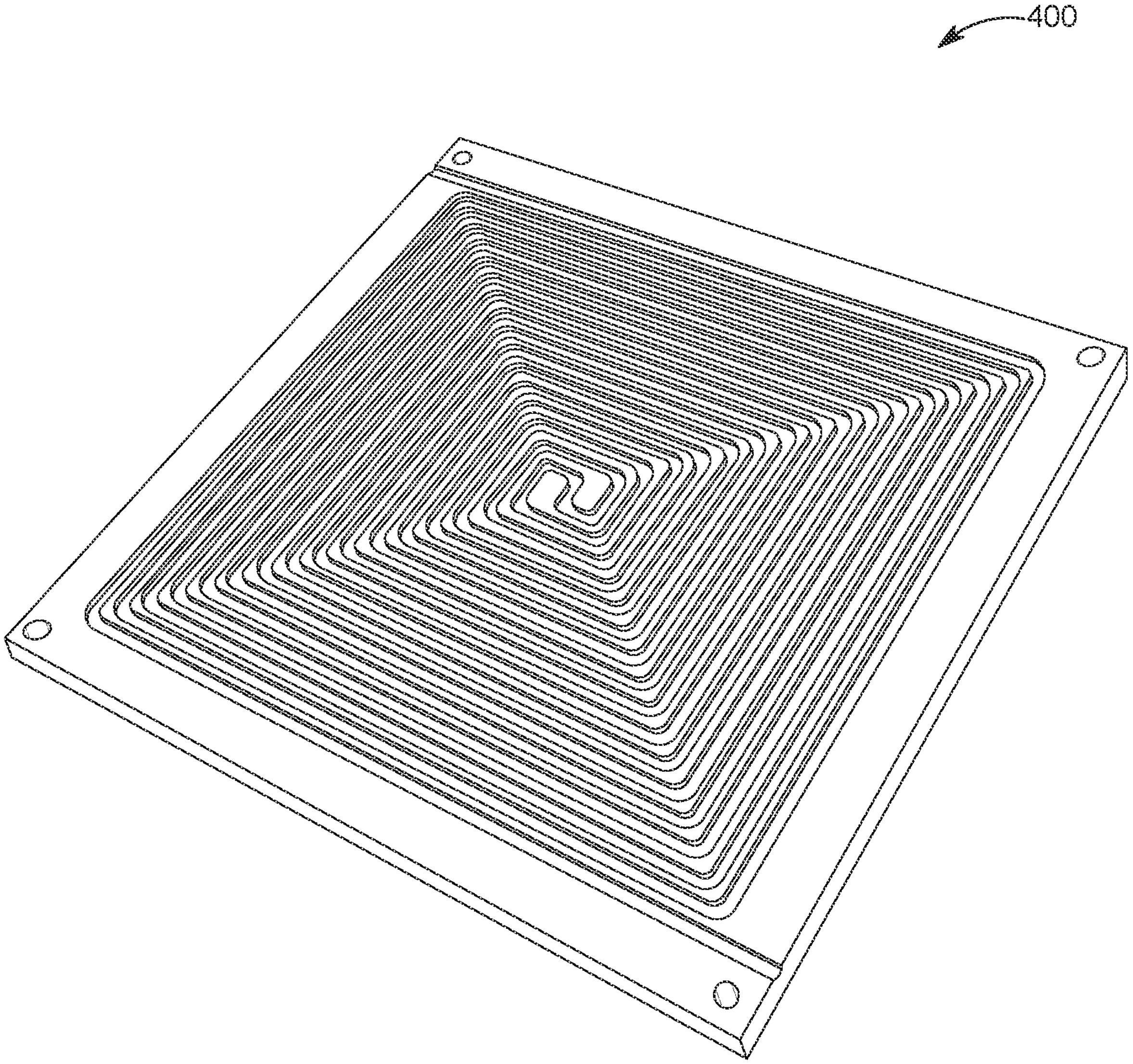
FIG. 6 is an illustration of a second module of the modular flow reactor for accelerated flow synthesis of InP QDs, in accordance with some embodiments of the presently disclosed subject matter.

FIG. 6 is an illustration of Module 400, which may represent a second module (or "Module II") of the modular flow reactor for accelerated flow synthesis of InP QDs. As illustrated in FIG. 6, in at least one embodiment, the second module may be a rapid heating reactor capable of heating an output of the first module rapidly with tunable heating rate a fast at 200° C./s. In various embodiments, the second module may be lined with a Teflon material, a Teflon-like material, or comprise stainless steel tubing. The second module may accordingly be capable of heating an output of the first module to a temperature of up to be up to 260° C. with polymeric Teflon tubing with tunable heating rate a fast at 200° C./s. The second module may accordingly be capable of heating an output of the first module to a temperature of up to be up to 500° C. with using stainless steel tubing with tunable heating rate a fast at 200° C./s. For example, in one embodiment, the second module is a Perfluoroalkoxy alkanes (PFA) lined rapid heating reactor capable of heating an output of the first module to a temperature of up to 260° C. in about 3 seconds. In one embodiment, the second module may be a PTFE lined or a fluorinated ethylene propylene (FEP) lined rapid heating reactor capable of heating an output of the first module rapidly to a specified temperature of up to 200° C. for in about 3 seconds. In one embodiment, the second module may be a rapid heating reactor comprising stainless steel tubing that capable of heating an output of the first module rapidly to the specified temperature of up to 500° C. in about 3 seconds. Accordingly, in various embodiments, the second module may be lined with a Teflon variant material or a Teflon-like material (e.g., fluorinated ethylene propylene, FEP), or the second module may include stainless steel tubing. The second module preforms a second step of a method performed by the system.

Figure 7:
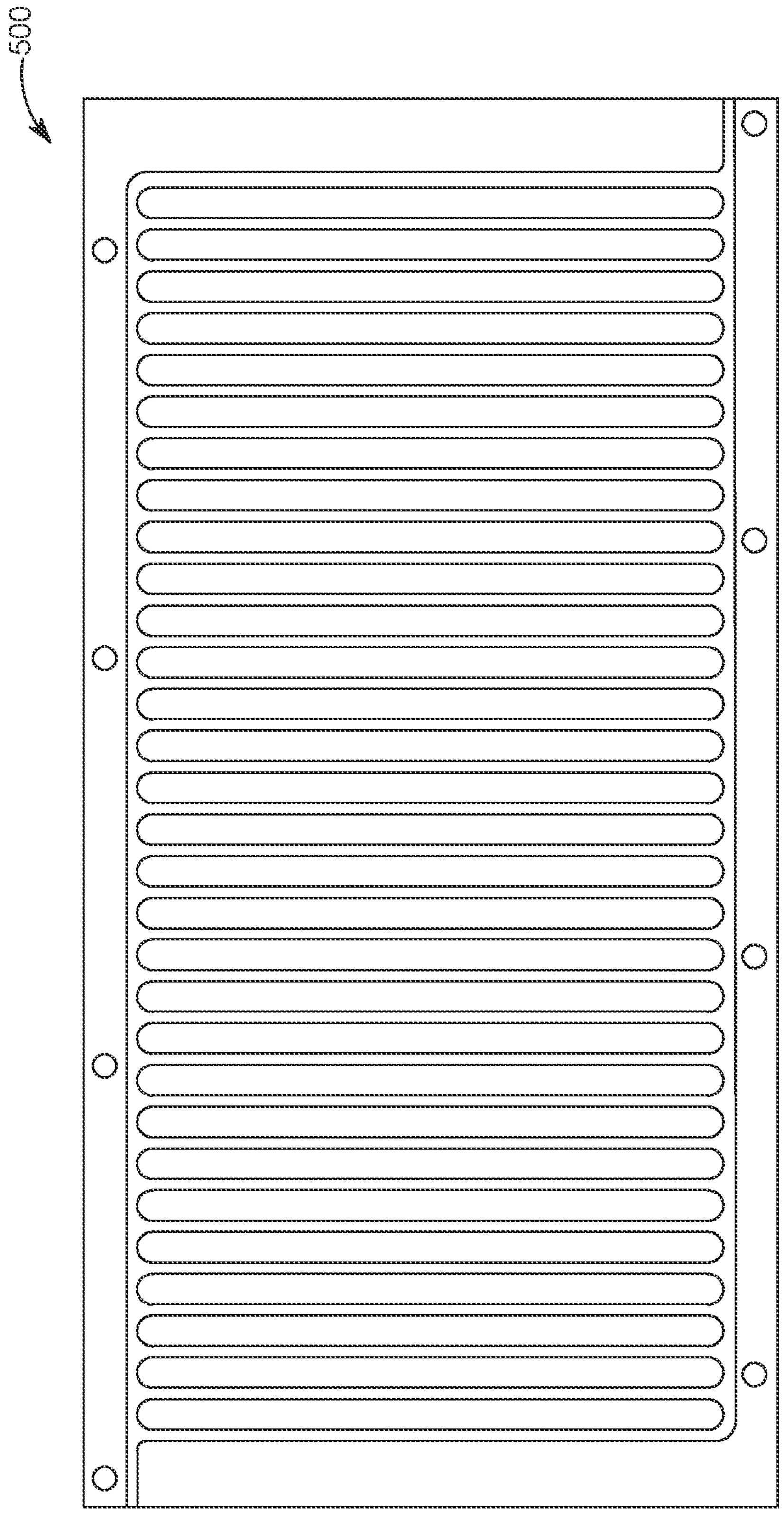
FIG. 7 is an illustration of a third module of the modular flow reactor for accelerated flow synthesis of InP QDs with tunable flow reactor length/volumes within the same heating module, in accordance with some embodiments of the presently disclosed subject matter.

FIG. 7 is an illustration of Module 500, which may represent a third module (or "Module III") of the modular flow reactor for accelerated flow synthesis of InP QDs with tunable flow reactor length/volumes within the same heating module. In one embodiment, the third module is a ramp heating reactor capable of heating an output of the second module at a temperature ramp rate of between 2° C./minute and 50° C./minute. In various embodiments, the third module may be lined with a Teflon material, a Teflon-like material, or comprise stainless steel tubing. The third module preforms a third step of a method performed by the system. In at least one embodiment, steps II and III may accordingly be performed by Teflon reactors with rapid heating and ramp heating capabilities, respectively, the unique design of the heating ramp module (i.e., the third module) can allow different flow reactor length (volume) to be accommodated within the same heating module (machined aluminum or stainless steel), without the need to redesign and fabricate a new heating plate. As it applies to each of the four modules mentioned herein, each heating module can be designed in a way that various flow reactor lengths (volume) could be accommodated within a same heating module by using different number of serpentine channels. As it applies to each of the four modules mentioned herein, accommodation of variable flow reactor length (volume) within the same heating module (both 2D plate and 3D helical heaters) may be accommodated using different number of loops or serpentine channels of the heating modules. The tubing of each module mentioned herein may be constructed or otherwise be lined with materials such as aluminum, stainless steel, copper, and similar other materials.

The third module illustrated in FIG. 7, in at least one embodiment, may share the same features as the second module. For example, in one embodiment, the third module may be a rapid heating reactor capable of heating an output of the second module rapidly with tunable heating rate a fast at 200° C./s. The third module may accordingly be capable of heating an output of the second module to a temperature of up to be up to 260° C. with polymeric Teflon tubing and up to 500° C. with using stainless steel tubing, with tunable heating rate a fast at 200° C./s. For example, in one embodiment, the third module is a Perfluoroalkoxy alkanes (PFA) lined rapid heating reactor capable of heating an output of the second module to a temperature of up to 260° C. in about 3 seconds. In one embodiment, the third module may be a PTFE lined or a fluorinated ethylene propylene (FEP) lined rapid heating reactor capable of heating an output of the second module rapidly to a specified temperature of up to 200° C. for in about 3 seconds. In one embodiment, the third module may be a rapid heating reactor comprising stainless steel tubing that capable of heating an output of the second module rapidly to the specified temperature of up to 500° C. in about 3 seconds. Accordingly, in various embodiments, the third module may be lined with a Teflon variant material or a Teflon-like material (e.g., fluorinated ethylene propylene, FEP), or the third module may include stainless steel tubing. In one embodiment, the perfluoroalkoxy alkanes (PFA) lined or polytetrafluoroethylene (PTFE) lined ramp heating reactor may be capable of heating an output of the second module at a temperature ramp rate of between 2° C./minute and 50° C./minute.

Figure 8:
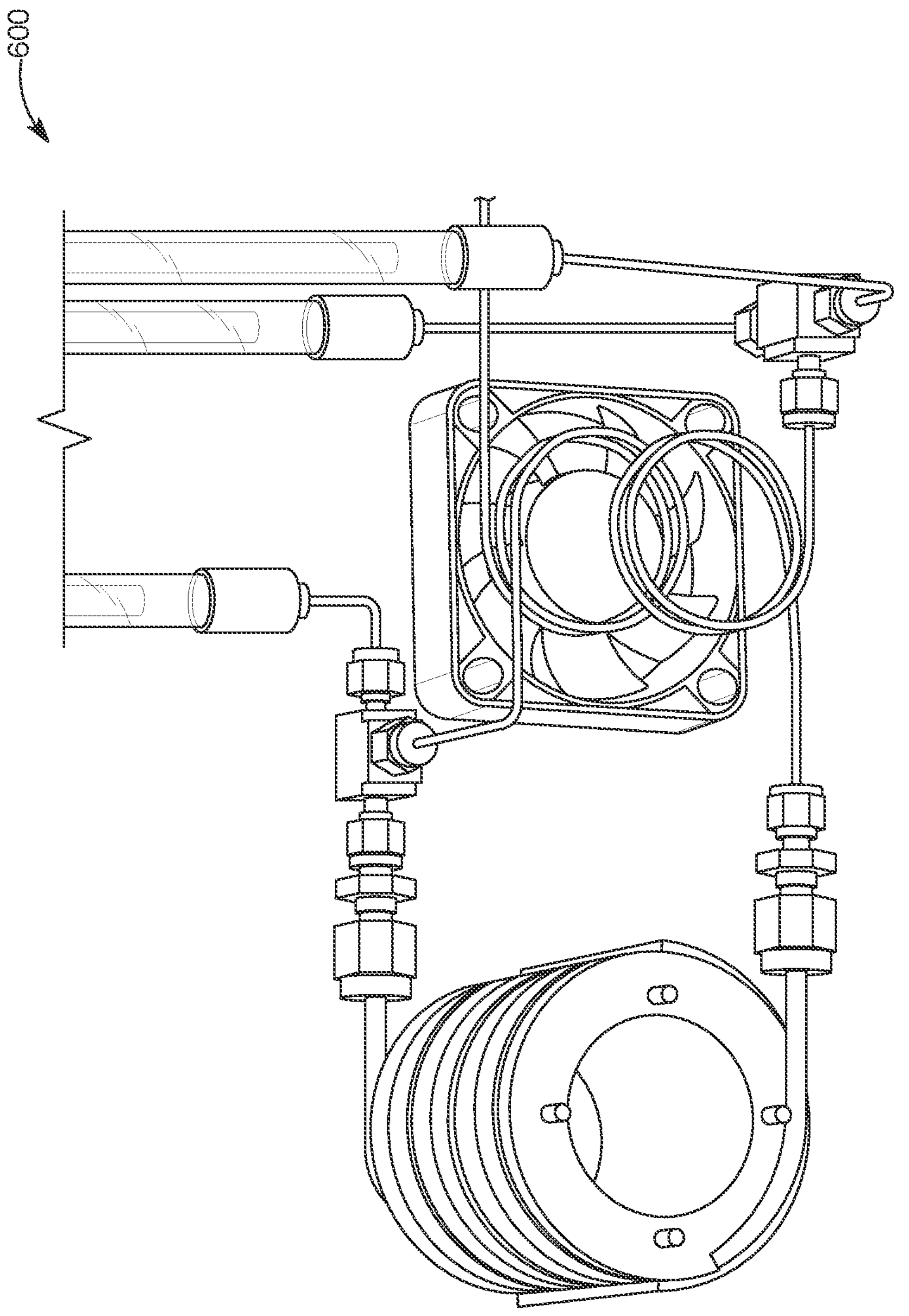
FIG. 8 is an illustration of a fourth module of the modular flow reactor for accelerated flow synthesis of InP QDs, in accordance with some embodiments of the presently disclosed subject matter.

FIG. 8 is an illustration of Module 600, which may represent a fourth module (or "Module IV") of the modular flow reactor for accelerated flow synthesis of InP QDs. The fourth module illustrated in FIG. 8, in at least one embodiment, may represent a reactor applying a temperature of up to 500° C. to an output of the third module to initiate growth and size focusing of one or more of an InP core and multiple layers of zinc selenide-zinc sulfide (ZnSe/ZnS) shell growth around the InP QD core. The fourth module performs a fourth step of a method performed by the system. The fourth module may represent a high-temperature flow reactor module that provides higher temperature range (up to 500° C.) that can be used for InP core growth and later on for multi-layer ZnSe/ZnS shell growth.

Figure 9:
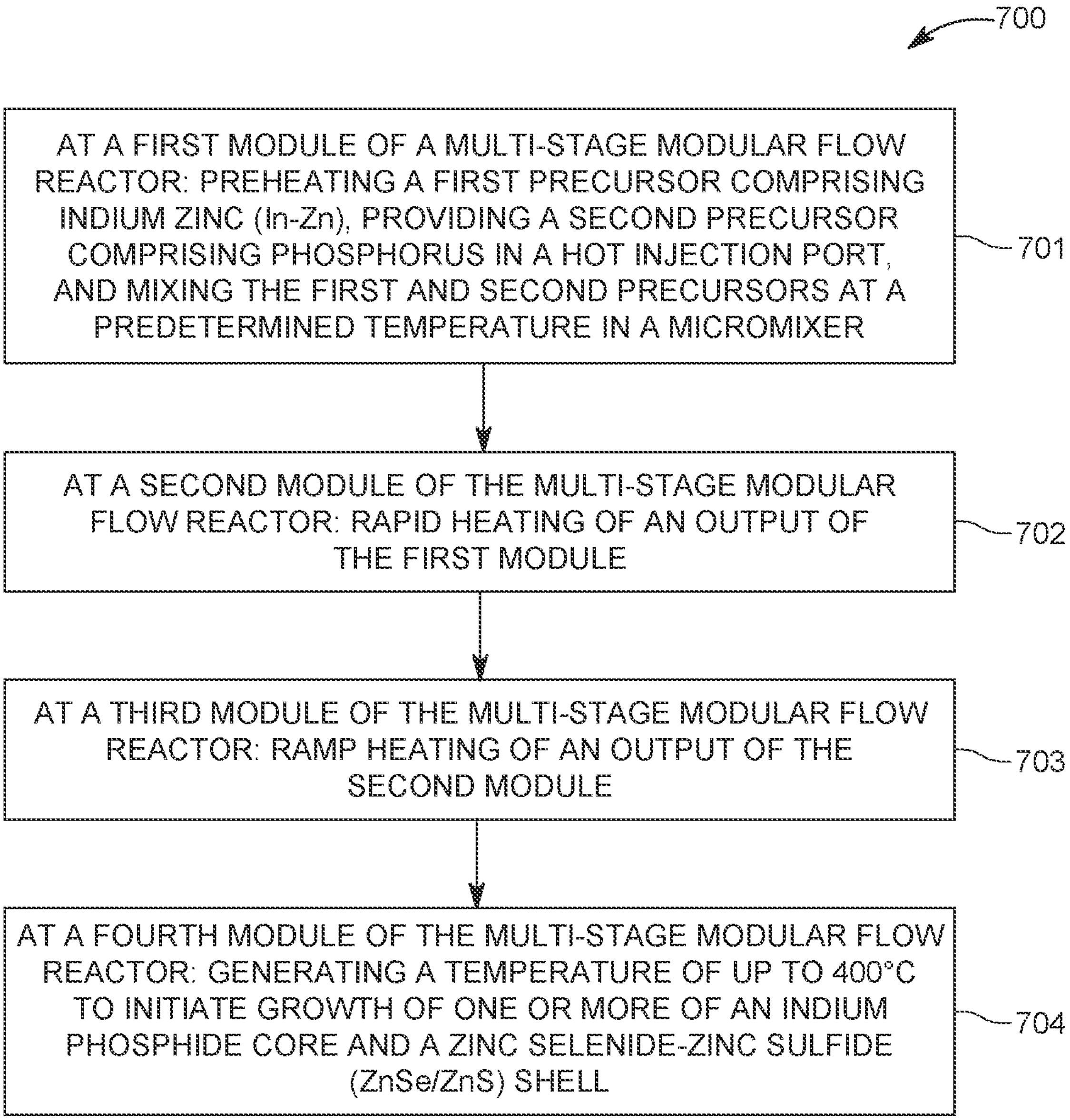
FIG. 9 is a flow chart illustrating a method of operating a modular flow reactor for accelerated flow synthesis of InP QD, according to one or more embodiments of the presently disclosed subject matter.

FIG. 9 is a flow chart 700 illustrating a method according to one or more embodiments of the presently disclosed subject matter. According to at least one embodiment, the method may include, at a first module of a multi-stage modular flow reactor: preheating a first precursor comprising indium zinc (In—Zn), providing a second precursor comprising phosphorus in a hot injection port, and mixing the first and second precursors at a predetermined temperature in a micromixer (step 701). The method may further include, at a second module of the multi-stage modular flow reactor: rapid heating of an output of the first module at a temperature ramp rate of up to 260° C. with a tunable heating rate up to 200° C./s (step 702). The method may furthermore include, at a third module of the multi-stage modular flow reactor: ramp heating of an output of the second module a temperature ramp rate of between 2° C./minute and 50° C./minute (step 703). The method may also include, at a fourth module of the multi-stage modular flow reactor: generating a temperature of up to 500° C. to initiate growth and size focusing of one or more of an indium phosphide (InP) core and multiple coating layers of zinc selenide (ZnSe) and/or zinc sulfide (ZnS) (step 704).

In one embodiment, the method may further comprise heating of an output of the third module in a fourth module of the at least four reactor modules, the fourth module generating a temperature of up to 500° C. to initiate growth and size focusing of an indium phosphide (InP) quantum dot (QD) core and multiple layers of zinc selenide-zinc sulfide (ZnSe/ZnS) shell growth around the indium phosphide (InP) quantum dot (QD) core.

In addition to providing for a multi-stage modular flow reactor, the system as illustrated in FIG. 3 may provide two unique capabilities: (i) in situ monitoring of the photophysical properties of QDs, and (ii) machine learning (ML)-driven process optimization that can also be integrated with the modular flow reactors. Accordingly, the computer module forming part of the system is configured to apply ML techniques based on in-situ optimization of the synthesis of quantum dots. The computer module forming part of the system further monitors in-situ photophysical properties of the quantum dots being synthesized. In various embodiments, in-situ spectroscopy could be conducted either at the outlet of the multi-stage flow reactor or after each individual module.

As is well-understood by persons of skill in the art, machine learning is a method of data analysis that automates analytical model building. It is a branch of artificial intelligence based on the idea that systems can learn from data, identify patterns and make decisions with minimal human intervention. The test for a machine learning model is a validation error on new data, not a theoretical test that proves a null hypothesis. Because machine learning often uses an iterative approach to learn from data, the learning can be easily automated. Passes are run through the data until a robust pattern is found. The computer module as mentioned herein can utilize machine learning techniques to understand the structure of the in-situ data on QD production and fit theoretical distributions to the data, and further probe the data for structure, even if there is no pre-existing theory of what that structure looks like. Accordingly, the computer module can use machine learning techniques to continuously improve and optimize the quality of QDs synthesized using the system as described herein.

Utilizing a modular flow reactor as described herein, forty different reactions of InP QDs were conducted utilizing about 40 mL of each precursor. The effect of residence time (FIG. 4A), temperature of each step (FIG. 4B), and precursor ratio (FIG. 4C) were studied. Furthermore, the reproducibility of the in-flow synthesis of InP QDs (see FIG. 4D) was evaluated. In the reactions conducted, a 1.4% variation of the first half-width-at-half-maximum (HWHM1) and Peak/Valley ratio was observed, while the first excitonic peak wavelength ($\lambda_P$) varied by only 0.2% across three days of continuous experiments. Full width at half maximum (FWHM) is an expression of the extent of function given by the difference between the two extreme values of the independent variable at which the dependent variable is equal to half of its maximum value. In other words, FWHM is the width of a spectrum curve measured between those points on the y-axis which are half the maximum amplitude. Half width at half maximum (HWHM) is half of the FWHM if the function is symmetric.

Accordingly, a first half-width-at-half-maximum (HWHM1) associated with the synthesis of quantum dots using the system as described herein was found to have a variation of 1.4% or less. Further, a peak/valley ratio of the associated with the synthesis of quantum dots using the system as described herein was found to exhibit a variation of 1.4% or less. Furthermore, a first excitonic peak wavelength ($\lambda_P$) associated with the synthesis of quantum dots using the system as described herein was found to exhibit a variation of 0.2% or less over a plurality of quantum dot synthesis sessions. Additionally, in various embodiments, the first excitonic peak wavelength ($\lambda_P$) of the synthesized quantum dots was tuned in the range of 425 nm$<\lambda_P<$475 nm for the InP core and 495 nm$<\lambda_P<$550 nm for InP QD core with multiple coating layers of ZnSe and ZnS. In at least one embodiment, the first half-width-at-half-maximum (HWHM1) of the synthesized QDs was found to possess an energy of below 90 meV (million electron-volts). In one embodiment the first half-width-at-half-maximum (HWHM1) of the synthesized QDs was found to have a variation of 1.4% or less.

According to at least one embodiment, a single-channel modular flow reactor technology as described herein can synthesize high-quality InP QDs at a throughput of 1.5 kg/day; however, the method can readily be scaled up to 50 kg/day using a numbering-up strategy (for e.g., by providing 30 parallel channels). Accordingly, in one embodiment, the system comprises a single quantum dot synthesizing channel comprising a single multi-stage modular flow reactor whereas in a further embodiment, the system may comprise at least thirty parallel quantum dot synthesizing channels, each channel comprising one multi-stage modular flow reactor. The modular flow synthesis technology as disclosed herein may synthesize InP QDs at least twenty times faster than the conventional batch synthesis techniques while simultaneously achieving superior properties such as better size distribution and fewer surface defects. The embodiments disclosed herein can accordingly provide for scaled-out large scale continuous manufacturing of InP QDs with a throughput of 50 kg/day with at least 30 parallel flow reactors using the same indium and phosphine precursor sources.

According to various embodiments, a method of synthesizing quantum dots using an in-flow modular flow reactor as described herein comprises providing a system comprising a multi-stage modular flow reactor for in-flow synthesis of quantum dots comprising at least four reactor modules; and a computer module for monitor and control of operations of the at least four reactor modules. The method further comprises synthesizing quantum dots using the system. In some embodiments, the method further comprises monitoring in-situ photophysical properties of the quantum dots being synthesized with the computer module. Further, the computer module applies machine learning techniques for in-situ optimization of the synthesis of quantum dots.

In at least one embodiment, the method comprises one or more of: preheating a first precursor comprising indium zinc (In—Zn) in a first module of the at least four reactor modules; providing a second precursor comprising phosphorus in a hot injection port of the first module; and, mixing the first and second precursors at a predetermined temperature in a micromixer of the first module. In various embodiments, the method also comprises rapid heating of an output of the first module in a second module of the at least four reactor modules, the second module being a Perfluoroalkoxy alkanes (PFA) or polytetrafluoroethylene (PTFE) lined rapid heating reactor capable of rapidly heating to the specified temperature of up to 260° C. in about 3 seconds for a PFA lined rapid heating reactor, and up to 200° C. in about 3 seconds for a PTFE lined rapid heating reactor in at least one embodiment. In various embodiments, the tubing may be placed inside an aluminum or stainless-steel heating plate. The tubing is configured for easy replacement. In at least one embodiment, there is a further plate covering each heating module to minimize heat loss. In at least one embodiment, each flow reactor module may be wrapped with a heat insulating fabric to maintain the uniform heat distribution within the flow reactors. In some embodiments, the method also comprising ramp heating of an output of the second module in a third module of the at least four reactor modules, the third module being a Perfluoroalkoxy alkanes (PFA) or polytetrafluoroethylene (PTFE) lined ramp heating reactor capable of delivering a temperature ramp rate of between 2° C./minute and 50° C./minute. In furthermore embodiments, the method also comprises heating of an output of the third module in a fourth module of the at least four reactor modules, the fourth module generating a temperature of up to 450° C. to initiate growth of one or more of an indium phosphide (InP) core and multiple layers of zinc selenide-zinc sulfide (ZnSe/ZnS) shell growth.

As is well known in the relevant art, a flow reactor allows large-scale automated production. Scaling out is simpler with a flow reactor as compared to a batch reaction process since it does not require changing the reactor geometry; further with a flow reactor, although the material throughput increases, the chemistry is the same. Scaling can be achieved by operating large numbers of identical reaction channel in parallel. There are two major types of flow reactors used in the synthesis of quantum dots—continuous and segmented flow. In continuous flow reactors, reaction and precipitation occur in the same phase. Miscible streams of reagents are injected into the channel where they mix and react. This technique is used to produce high quality nanoparticles like metals, metal oxides and compound semiconductors. One disadvantage of continuous flow reactors is that the liquid front experiences friction with the walls of the channel which induces a parabolic velocity profile across the channel with particles contacting the walls of the channel having greater residence time compared to particles located at the center. This variation of speed leads to polydisperse size distribution. Further, over time, due to contact with the channel walls, precipitating particles can begin to accumulate and form a stagnant layer adjacent to the channel walls leading to eventual fouling of the channel. In various embodiments, the multi-stage flow reactor design disclosed herein may be compatible with single-phase and multi-phase flow synthesis formats. The multi-phase flow synthesis format may be gas-liquid using an inert gas (argon or nitrogen) or liquid-liquid using an inert fluorinated oil (e.g., perfluorinated oil).

In segmented flow reactors, a second immiscible carrier fluid is injected at the same time as the reagents. This immiscible carrier fluid splits and surrounds the reacting mixture forming tiny droplets, which flows through the channel. Inside the droplets, a uniformly circulating flow profile develops providing a completely uniform residence time for the nanoparticles and an enhanced mixing of reagents. The carrier fluid can be gas as in the case of "gas/liquid" mode or a liquid as in a "liquid/liquid" mode. Although the "gas/liquid" mode prevents the parabolic velocity flow profile, the mixing reagents droplets continue to make contact with the channel walls, eventually leading to channel blockage. This shortcoming can be eliminated by the "liquid/liquid" mode as it not only provides an equal residence time within a droplet, but it also isolates the droplets from the walls of the channel by wetting the full surface of the channel wall.

Microfluidic reactors exhibit intrinsic advantages of reduced chemical consumption, safety, high surface-area-to-volume ratios, improved control over mass and heat transfer. An integrated microfluidic system represents a scalable integration of a microchannel.

Figure 2:
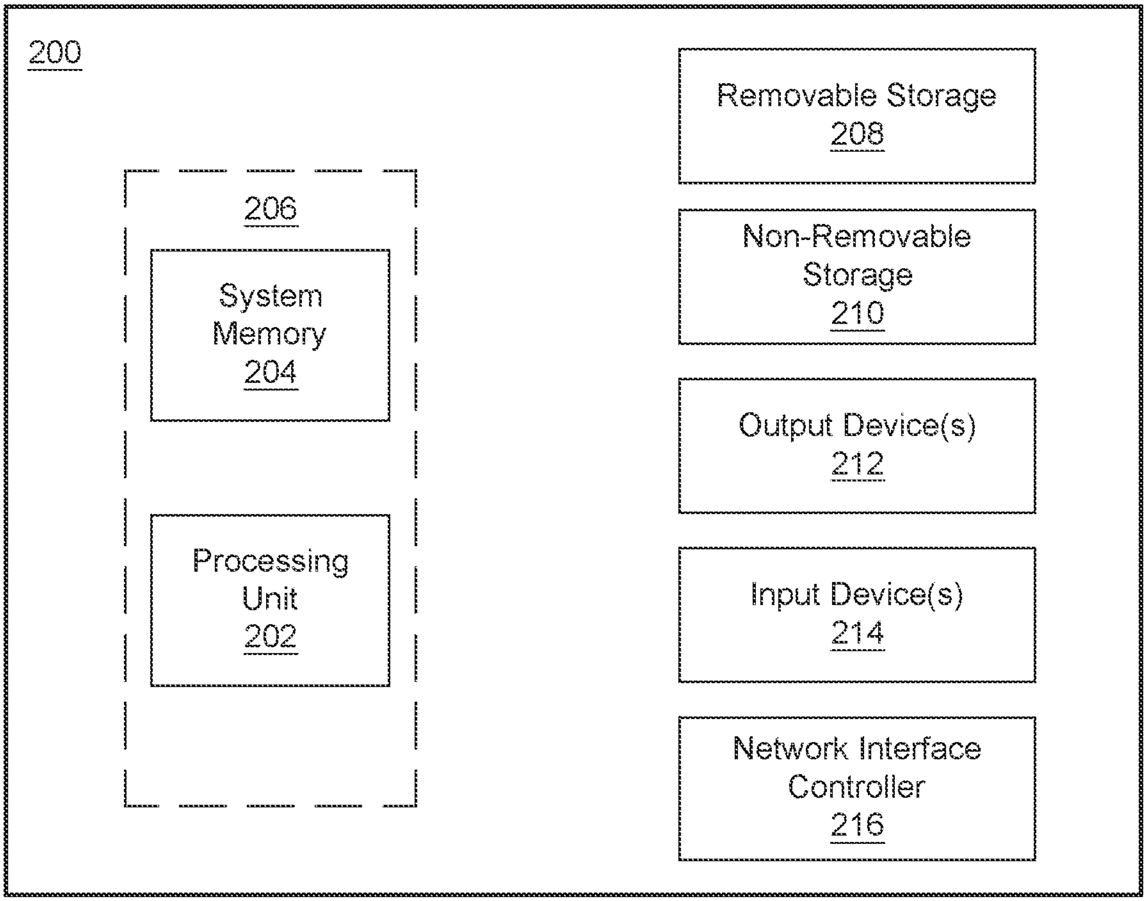
FIG. 2 illustrates a schematic view of a computing device forming part of a multi-stage modular flow reactor, in accordance with some embodiments of the presently disclosed subject matter.

Microfluidic reactors can be used to fabricate nanomaterials such as, for example, quantum dots (QDs). A microfluidic reactor such as, for example, a flow reactor can be used to produce QDs. FIGS. 1 through 3 illustrate various aspects of a microfluidic flow reactor, according to some embodiments of the presently disclosed subject matter. In one embodiment, as illustrated in FIG. 1, the multi-stage modular flow reactor as disclosed herein may be a modular microfluidic reactor. As shown in FIG. 1, one or more of Module I through Module IV as mentioned herein (i.e., one or more of the first module, the second module, third module, and the fourth module as mentioned herein) can take the form of device 100 as illustrated in FIG. 1. In at least one embodiment, device 100 may comprise: a sample conduit 102 providing a path for fluid flow extending from a sample inlet 104 to a sample outlet 106; a thermal housing 108 enclosing the sample conduit 102, wherein the thermal housing 108 comprises a plurality of measurement regions 110.

Thermal housing 108 can comprise any suitable thermally conductive material. In some examples, the thermal housing 108 can comprise a metal (e.g., aluminum, stainless steel, copper). The plurality of measurement regions 110 can, for example, be substantially spectroscopically transparent. As used herein, "substantially spectroscopically transparent" is meant to include any material that is substantially transparent at the wavelength or wavelength region of interest. The plurality of measurement regions 110 can, for example, comprise a plurality of voids, a plurality of windows comprising a substantially spectroscopically transparent material, or a combination thereof. The substantially spectroscopically transparent material can comprise glass, quartz, silicon dioxide, a polymer, or a combination thereof.

Device 100 can, for example, further comprise a light source. The light source can be any type of light source. Examples of suitable light sources include natural light sources (e.g., sunlight) and artificial light sources (e.g., incandescent light bulbs, light emitting diodes, gas discharge lamps, arc lamps, lasers etc.). In some examples, the light source can comprise an incandescent light bulb, a light emitting diode, a gas discharge lamp, an arc lamp, a laser, or a combination thereof. In certain examples, the light source comprises a light emitting diode, a halogen lamp, a tungsten lamp, or a combination thereof. The light source can be configured such that it illuminates the sample conduit 102 at one or more measurement regions 110.

Detector 118 can comprise, for example, a camera, an optical microscope, an electron microscope, a spectrometer, or combinations thereof. In some examples, the detector 118 comprises a spectrometer. Examples of spectrometers include, but are not limited to, Raman spectrometers, UV-vis-NIR absorption spectrometers, IR absorption spectrometers, fluorescence spectrometers, and combinations thereof.

In certain examples, device 100 may further comprise a three-port cell, wherein the three-port cell can hold one or more detectors and one or more light sources. In certain examples, the light source can comprise an LED light source and the detector can comprise a fluorescence spectrometer, wherein the device is configured such that the LED light source and the fluorescence spectrometer are aligned perpendicular to one another with respect to the measurement region. In certain examples, the light source can comprise a broadband light source and the detector can comprise an absorption spectrometer, wherein the device is configured such that the broadband light source is in-line with the absorption spectrometer with respect to the measurement region.

Device 100 may, in some examples, further comprise a sample preparation element fluidly connected to the sample inlet 104. Device 100 may, in some examples, further comprise a heating element thermally connected to a thermal jacket and/or the thermal housing 108 to control the temperature of the thermal jacket and/or the thermal housing 108. The heating element can set the temperature of the thermal jacket and/or the thermal housing 108 to a temperature of, for example, 25° C. or more. In some examples, the heating element can set the temperature of the thermal jacket and/or the thermal housing 108 to a temperature of 500° C. or less. The temperature that the heating element sets the thermal jacket and/or the thermal housing 108 to can range from any of the minimum values described above to any of the maximum values described above. For example, the heating element can set the temperature of the thermal jacket and/or the thermal housing 108 to a temperature of from 25° C. to 500° C. In some examples, the device 100 can further comprise an injector fluidly connected to a sample reservoir such that the injector is configured to inject a sample into the sample conduit 102 at a first flow rate via the sample inlet 104.

In some examples, the sample can comprise a plurality of particles, such as a plurality of metal particles, a plurality of semiconductor particles, a plurality of nanoparticles or nanomaterials, or a combination thereof. In some examples, the sample can comprise a plurality of polymer capped metal particles, such as a plurality of plasmonic particles, a plurality of quantum dots, a plurality of just-fabricated nanoparticles/nanomaterials or combinations thereof.

The plurality of particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod-shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

For example, the plurality of particles can have an average particle size of 1 nanometer (nm) or more. In some examples, the plurality of particles can have an average particle size of 1 micrometer (micron, μm) or less. The average particle size of the plurality of particles can range from any of the minimum values described above to any of the maximum values described above. For example, the plurality of particles can have an average particle size of 1 nm to 1 micron.

In some examples, the plurality of particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, and within 15% of the median particle size).

The plurality of particles can comprise particles of any shape (e.g., a sphere, a rod, a quadrilateral, an ellipse, a triangle, a polygon, etc.). In some examples, the plurality of particles can have an isotropic shape. In some examples, the plurality of particles can have an anisotropic shape.

In some examples, the plurality of particles can comprise a first population of particles comprising a first material and having a first particle shape and a first average particle size and a second population of particles comprising a second material and having a second particle shape and a second average particle size; wherein the first particle shape and the second particle shape are different, the first material and the second material are different, the first average particle size and the second average particle size are different, or a combination thereof. In some examples, the plurality of particles can comprise a mixture of a plurality of populations of particles, wherein each population of particles within the mixture is different with respect to shape, composition, size, or combinations thereof. In some examples, the sample can comprise an organic molecule. In some examples, the device 100 can further comprise a second detector fluidly coupled to the sample outlet 106. In some examples, the device 100 can further comprise a chromatograph fluidly coupled to the sample outlet 106. In some examples, the device 100 can further comprise a computing device 200 configured to send, receive, and/or process signals from the various components of the device 100.

FIG. 2 illustrates an example computing device 200 upon which examples disclosed herein may be implemented. In one embodiment, computing device 200 can form part of the system as disclosed herein. Computing device 200 may comprise a computer module or a controller as mentioned herein. The computing device 200 can include a bus or other communication mechanism for communicating information among various components of the computing device 200. In its most basic configuration, computing device 200 typically includes at least one processing unit 202 (a processor) and system memory 204. Depending on the exact configuration and type of computing device, system memory 204 may be volatile (such as random-access memory (RAM)), non-volatile (such as read-only memory (ROM), flash memory, etc.), or some combination of the two. This most basic configuration is illustrated in FIG. 2 by a dashed line 206. Processing unit 202 may be a standard programmable processor that performs arithmetic and logic operations necessary for operation of computing device 200.

Computing device 200 may have additional features/functionality. For example, computing device 200 may include additional storage such as removable storage 208 and non-removable storage 210 including, but not limited to, magnetic or optical disks or tapes. The computing device 200 can also contain network connection(s) 216 that allow the device to communicate with other devices. The computing device 200 can also have input device(s) 214 such as a keyboard, mouse, touch screen, antenna or other systems configured to communicate with the camera in the system described above, etc. Output device(s) 212 such as a display, speakers, printer, etc. may also be included. The additional devices can be connected to the bus in order to facilitate communication of data among the components of the computing device 200.

Processing unit 202 may be configured to execute program code encoded in tangible, computer-readable media. Computer-readable media refers to any media that is capable of providing data that causes computing device 200 (i.e., a machine) to operate in a particular fashion. Various computer-readable media can be utilized to provide instructions to processing unit 202 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, processing unit 202 can execute program code stored in system memory 204. For example, the bus can carry data to the system memory 204, from which processing unit 202 receives and executes instructions. The data received by system memory 204 can optionally be stored on the removable storage 208 or the non-removable storage 210 before or after execution by the processing unit 202. Computing device 200 typically includes a variety of computer-readable media.

Computer-readable media can be any available media that can be accessed by computing device 200 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 204, removable storage 208, and non-removable storage 210 are all examples of computer storage media.

Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 200. Any such computer storage media can be part of computing device 200.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high-level procedural or object-oriented programming language to communicate with a computer system. However, the program(s) can be implemented in assembly or machine language, if desired. In any case, the language can be a compiled or interpreted language and it may be combined with hardware implementations.

In some examples, the system memory 204 computer-executable instructions stored thereon that, when executed by the processor, cause the processor to repeat steps to determine and output the location of a first measurement region and/or second measurement region.

In various embodiments, the computer module for monitor and control of operations of the four reactor modules may comprise a computing device that shares the same or similar features as computing device 200. In some embodiments, the computer module comprises an integrated circuit (IC) controller that shares the same or similar features as processing unit 202. In some embodiments, the computer module comprises system memory that shares the same or similar features as system memory 204. In some embodiments the computer module for monitor and control of operations of the at least four reactor modules comprises a memory similar to system memory 204 that has computer-executable instructions stored thereon that, when executed by the processor, cause the processor to apply machine learning to monitor and control the quality and quantity of the synthesis of QDs produced by the system as described herein.

It will be appreciated that the systems and methods described herein may be implemented using various types of user interfaces, such as user interfaces that allow the users to log in and update their profile, availability, etc. For example, as explained above, the user interface may be implemented in a mobile app, or on a web browser.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCanal®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms “a”, “an”, and “the” refer to “one or more” when used in the subject specification, including the claims. Thus, for example, reference to “a device” can include a plurality of such devices, and so forth.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for in-flow synthesis of a colloidal nanomaterial, the system comprising:
- a first distinct reactor module configured for:
  - preheating an indium-zinc precursor;
  - providing a hot injection port configured for injecting a phosphorus precursor, and
  - mixing the indium-zinc precursor and the phosphorus precursor in a micromixer at a predetermined temperature after preheating the indium-zinc precursor;
- a second distinct reactor module fluidly coupled to the first distinct reactor module and configured for heating an output of the first distinct reactor module to a temperature up to 500° C. within 3 seconds;
- a third distinct reactor module fluidly coupled to the second distinct reactor module and configured for applying a ramp heating profile at a rate between 2° C. and 50° C./minute; and
- a fourth distinct reactor module fluidly coupled to the third distinct reactor module and configured for applying a temperature of up to 500° C. to initiate growth and size focusing of at least one of an InP QD core, a ZnSe shell, and ZnS shell;

and
- a computer module configured for controlling the first, second, third, and fourth distinct reactor modules.

2. The system of claim 1, wherein the colloidal nanomaterial comprises quantum dots.

3. The system of claim 1, wherein at least one distinct reactor module comprises a variable volume module, wherein a volume is adjusted by opening or closing of one or more serpentine channels of the at least one distinct reactor module.

4. The system of claim 3, wherein the volume is adjusted based on a target colloidal nanomaterial to be synthesized.

5. The system of claim 1, wherein at least one distinct reactor module is at least one of a machined heating module and a reusable heating module.

6. The system of claim 1, wherein at least one distinct reactor module comprises one or more of:
- a Teflon material placed within a machined heating module;
- a Teflon-like material placed within a machined heating module; and
- a stainless-steel tubing placed within a machined heating module.

7. The system of claim 1, wherein the second distinct reactor module comprises at least one of a Teflon material and a Teflon-like material.

8. The system of claim 1, wherein the second distinct reactor module comprises a stainless-steel tubing.

9. The system of claim 2, wherein the computer module is configured for monitoring photophysical properties of the quantum dots being synthesized at one or more of:
- an outlet of the system after cooling down of a reaction mixture;
- in-situ at a synthesis temperature; and
- at an outlet of the first, second, third, and fourth distinct reactor modules.

10. The system of claim 2, wherein a first half-width-at-half-maximum (HWHM1) of the quantum dots is one or more of: possessing an energy of below 90 meV and having a variation of 1.4% or less.

11. The system of claim 2, wherein a peak/valley ratio of the quantum dots has a variation of 1.4% or less.

12. The system of claim 2, wherein a first excitonic peak wavelength ($\lambda_p$) of the quantum dots is tuned in a range of 425 nm$<\lambda_p<$475 nm for an InP core and 495 nm $<\lambda_p<$550 nm for a InP QD core with multiple layers of zinc selenide—zinc sulfide (ZnSe/ZnS) coating.

13. The system of claim 12, wherein the first excitonic peak wavelength ($\lambda_p$) of the quantum dots has a variation of 0.2% or less over a plurality of quantum dot synthesis sessions.

14. The system of claim 1, wherein:
- the system further comprises at least thirty parallel quantum dot synthesizing channels configured for providing a continuous manufacturing throughput of up to 50 kg/day; and
- each parallel quantum dot synthesizing channel comprises a single multi-stage modular flow reactor.

15. A method of synthesizing quantum dots using an in-flow modular flow reactor, the method comprising:
- providing a system comprising a multi-stage modular flow reactor for in-flow synthesis of quantum dots, the multi-stage modular flow reactor comprising:
  - a first distinct reactor module configured for:
  - preheating an indium-zinc precursor;
  - providing a hot injection port configured for injecting a phosphorus precursor, and
  - mixing the indium-zinc precursor and the phosphorus precursor in a micromixer at a predetermined temperature after preheating the indium-zinc precursor;
  - a second distinct reactor module fluidly coupled to the first distinct reactor module and configured for heating an output of the first distinct reactor module to a temperature up to 500° C. within 3 seconds;
  - a third distinct reactor module fluidly coupled to the second distinct reactor module and configured for applying a ramp heating profile at a rate between 2° C. and 50° C./minute; and
  - a fourth distinct reactor module fluidly coupled to the third distinct reactor module and configured for applying a temperature of up to 500° C. to initiate growth and size focusing of at least one of an InP QD core, a ZnSe shell, and ZnS shell;
  - and
  - a computer module configured for controlling the first, second, third, and fourth distinct reactor modules;
- and
- performing in-flow synthesis of quantum dots using the system.

16. The method of claim 15, further comprising: monitoring, by the computer module, of photophysical properties of the quantum dots being synthesized at one or more of:
- an outlet of the multi-stage modular flow reactor after cooling down of a reaction mixture;
- in-situ at a synthesis temperature; and
- at an outlet of the first, second, third, and fourth distinct reactor modules.

17. The method of claim 15, further comprising: applying, by the computer module, of machine learning (ML) techniques for in-situ optimization of the in-flow synthesis of quantum dots.

18. The method of claim 15, wherein at least one distinct reactor module comprises a variable volume module, wherein a volume is adjusted by opening or closing of one or more serpentine channels of the at least one distinct reactor module.

19. The method of claim 18, wherein the volume is adjusted based on a target colloidal nanomaterial to be synthesized.

20. The method of claim 15, wherein at least one distinct reactor module is at least one of a machined heating module and a reusable heating module.

* * * * *